(12) United States Patent
Dube et al.

(10) Patent No.: US 8,265,390 B2
(45) Date of Patent: Sep. 11, 2012

(54) PROBABILISTIC SEGMENTATION IN COMPUTER-AIDED DETECTION

(75) Inventors: Shishir Dube, Arden, NC (US); Sarang Lakare, Chester Springs, PA (US); Gerardo Hermosillo Valadez, West Chester, PA (US); Yoshihisa Shinagawa, Dowingtown, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 581 days.

(21) Appl. No.: 12/555,799

(22) Filed: Sep. 8, 2009

(65) Prior Publication Data

US 2010/0166276 A1     Jul. 1, 2010

Related U.S. Application Data

(60) Provisional application No. 61/113,289, filed on Nov. 11, 2008.

(51) Int. Cl.
     *G06K 9/00*      (2006.01)
(52) U.S. Cl. .......................... 382/168; 382/131; 382/171
(58) Field of Classification Search .................. 382/128, 382/131, 168, 171; 378/4, 98.12
See application file for complete search history.

(56) References Cited

U.S. PATENT DOCUMENTS

| | | | | |
|---|---|---|---|---|
| 5,963,665 | A * | 10/1999 | Kim et al. | 382/169 |
| 6,138,045 | A | 10/2000 | Kupinski et al. | |
| 6,219,447 | B1 * | 4/2001 | Lee | 382/168 |
| 6,463,173 | B1 * | 10/2002 | Tretter | 382/168 |
| 6,625,308 | B1 * | 9/2003 | Acharya et al. | 382/168 |
| 7,020,333 | B2 * | 3/2006 | Yang et al. | 382/169 |
| 7,760,939 | B2 * | 7/2010 | Zwanger | 382/170 |
| 7,840,066 | B1 * | 11/2010 | Chen et al. | 382/168 |

OTHER PUBLICATIONS

Philip J. Drew et al., Dynamic Contrast Enhanced Magnetic Resonance Imaging of the Breast is Superior to Triple Assessment for the Pre-Operative Detection of Multifocal Breast Cancer, Annals of Surgical Oncology, 1999, pp. 599-603, vol. 6, No. 6, Lippincott Williams & Wilkins.
Lia Bartella et al., Imaging Breast Cancer, Radiologic Clinics of North America, 2007, pp. 45-67, vol. 45, Elsevier Inc.
S. Sinha et al., Recent advances in breast MRI and MRS, NMR in Biomedicine, Jul. 23, 2008, pp. 3-16, vol. 22, John Wiley & Sons, Ltd.
Shantanu Sinha et al., Multifeature Analysis of Gd-Enhanced MR Images of Breast Lesions, JMRI, Nov./Dec. 1997, pp. 1016-1026, vol. 7 No. 6, ISMRM.
Flora Ann Lucas-Quesada et al., Segmentation Strategies for Breast Tumors from Dynamic MR Images, JMRI, Sep./Oct. 1996, pp. 753-763, vol. 6 No. 5, ISMRM.
Weijie Chen et al., A Fuzzy C-Means (FCM)-Based Approach for Computerized Segmentation of Breast, Lesions, in Dynamic Contrast-Enhanced MR Images, Acad Radiol, 2006, pp. 63-72, vol. 13, AUR.

* cited by examiner

*Primary Examiner* — Alexander H Tanningco
(74) *Attorney, Agent, or Firm* — Peter Withstandley

(57) ABSTRACT

Described herein is a method and system for facilitating segmentation of images. A difference image is received and processed to extract at least one histogram (402). A noise component is determined by fitting a symmetric Gaussian distribution to the extracted histogram such that the negative portion of the Gaussian distribution coincides with the negative portion of the histogram (403). The noise component is then subtracted from the histogram to generate a probability distribution function (404), which may be converted to a cumulative distribution function (406) and applied to the difference image to generate a probabilistic representation of contrast enhancement (408).

20 Claims, 13 Drawing Sheets

ORIGINAL $I_{diff}$

RESULTANT $i_{CE}$

BEFORE: (a) (b) (c)

AFTER:

PROBABILISTIC SEGMENTATION IN COMPUTER-AIDED DETECTION

CROSS-REFERENCE TO RELATED APPLICATION

The present application claims the benefit of U.S. provisional application No. 61/113,289 filed Nov. 11, 2008, the entire contents of which are herein incorporated by reference.

TECHNICAL FIELD

The present disclosure relates generally to computer-aided detection (CAD), and more particularly to probabilistic segmentation in computer-aided detection.

BACKGROUND

Breast cancer is one of the most prevalent cancers in women from western countries. Detection and diagnosis of the disease is routinely done by X-ray mammography but its sensitivity varies significantly. Another common medical imaging technique is magnetic resonance imaging (MRI), which uses a powerful magnetic field to image the internal structure and certain functionality of a body. MRI is particularly suited for imaging soft tissue structures and is thus highly useful in the field of oncology for the detection of breast lesions.

A variety of techniques have been proposed to automatically segment breast lesions. One of the earlier techniques used temporal correlation of dynamic data to segment the malignant lesions. Sinha S, Lucas Quesada F A, DeBruhl N D, Sayre J, Farria D, Gorczyca D P, Bassett L W, "Multifeature analysis of Gd-enhanced MR images of breast lesions," JMRI 1997; 7: 1016-1026. Lucas-Quesada et al. investigated semi-automated 2D-based methods. Lucas-Quesada F A, Sinha U, Sinha S., "Segmentation strategies for breast tumors from dynamic MR images," JMRI 1996; 6: 753-763. Another approach proposed by Chen et al. used a semi-automated fuzzy c-means clustering based approach. Chen W, Giger M L, Bick U., "A fuzzy c-means (FCM)-based approach for computerized segmentation of breast lesions in dynamic contrast-enhanced MR images," Acad Radiol 2006; 13: 63-72. One problem with these prior techniques is that they require too much user interaction. In addition, the output provided by these techniques is typically binary, and not applicable to different institutions' data.

Therefore, there is a need for a technology that mitigates or obviates the foregoing problems.

SUMMARY

A technology for facilitating segmentation of images is described herein. A difference image is received and processed to extract at least one histogram. A noise component is determined by fitting a symmetric Gaussian distribution to the extracted histogram, such that the negative portion of the Gaussian distribution coincides with the negative portion of the histogram. The noise component is then subtracted from the histogram to generate a probability distribution function, which may be converted to a cumulative distribution function and applied to the difference image to generate a probabilistic representation of contrast enhancement.

BRIEF DESCRIPTION OF THE DRAWINGS

The same numbers are used throughout the drawings to reference like elements and features.

DETAILED DESCRIPTION

Figure 1:
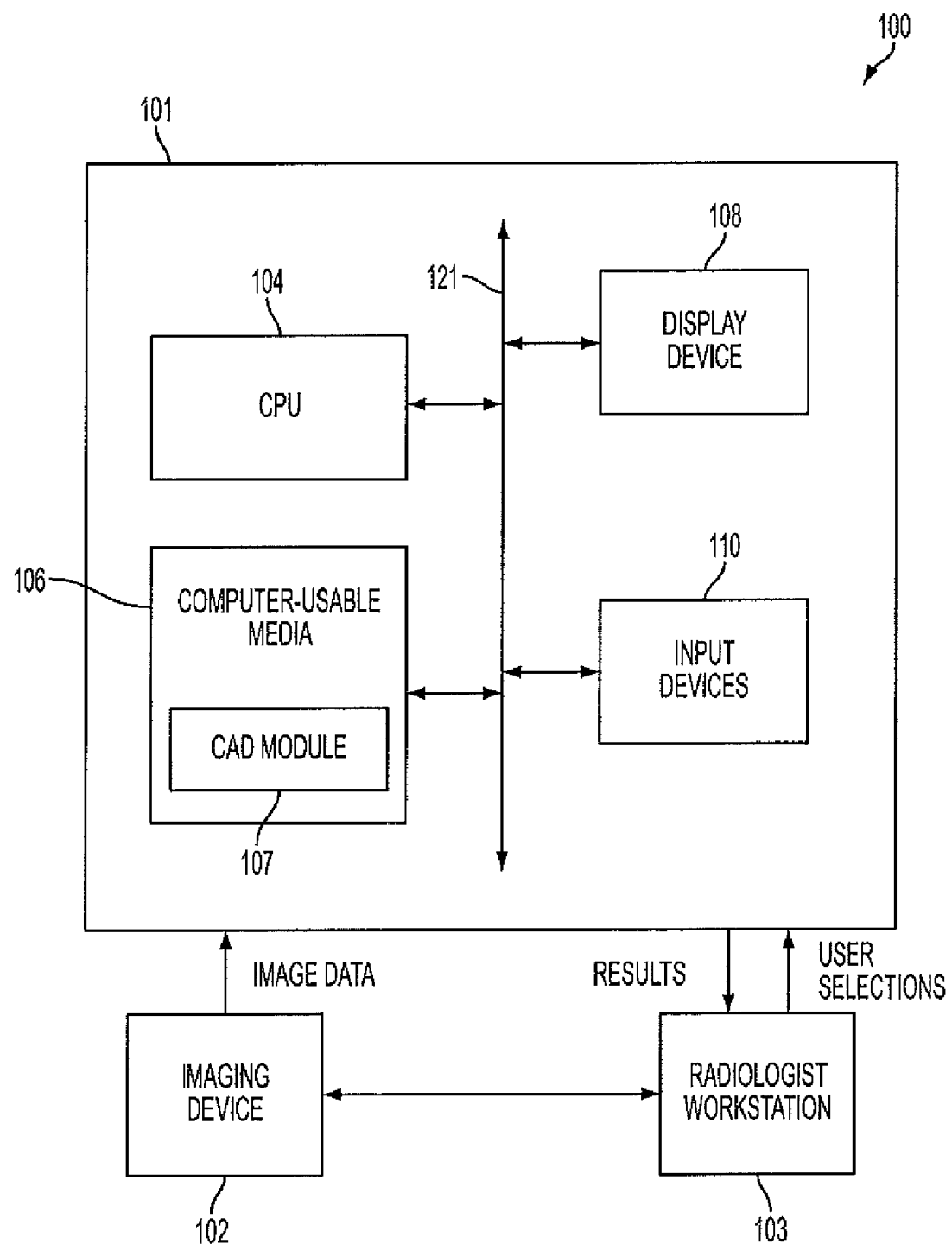
FIG. 1 shows a block diagram illustrating an exemplary CAD system.

In the following description, for purposes of explanation, specific numbers, materials and configurations are set forth in order to provide a thorough understanding of the present systems and methods and in order to meet statutory written description, enablement, and best-mode requirements. However, it will be apparent to one skilled in the art that the present systems and methods may be practiced without the specific exemplary details. In other instances, well-known features are omitted or simplified to clarify the description of the exemplary implementations of present systems and methods, and to thereby better explain the present systems and methods. Furthermore, for ease of understanding, certain method steps are delineated as separate steps; however, these separately delineated steps should not be construed as necessarily order dependent in their performance.

The following description sets forth one or more implementations of systems and methods that facilitate segmentation in computer aided detection (CAD). One aspect of the present framework provides a probabilistic representation of contrast enhancement. Difference or subtracted images are converted to probabilistic representations of contrast enhancement. This may be achieved by extracting at least one histogram of each difference image and subtracting a noise component from the histogram to generate a probability distribution function. The noise component may be determined by fitting a symmetric Gaussian distribution to the histogram such that the negative portion of the Gaussian distribution curve coincides with the negative portion of the histogram. The probability distribution function may be converted to a cumulative distribution function and applied to the difference image to generate the probabilistic representation of contrast enhancement.

Another aspect of the present framework converts the probabilistic representations of contrast enhancement to probabilistic segmentation masks by applying probabilistic methods such as connectivity mapping and distance mapping. Each voxel of the probabilistic segmentation mask is indicative of a likelihood that the voxel belongs to a pre-determined class based on at least one feature. The feature includes, for example, a connectivity feature or distance feature.

Yet another aspect provides a single-click-point interface for automatic segmentation. The single-click input may be provided as a seed point for segmentation either manually by a skilled user or automatically by a CAD tool. The single-click-point interface advantageously reduces the amount of user interaction required to operate the segmentation process.

Another advantage of the present framework is that it allows a skilled user to tune the parameters of the segmentation process and scale it in real-time to obtain an ideal delineation and a probabilistic output. For example, the radiologist may vary the probability threshold to obtain different delineations. Furthermore, the probabilistic segmentation output is adaptive to any or most sets of subtraction images and is found to be robust across different institution datasets. The ability to obtain an ideal segmentation allows for accurate extraction of features such as shape, texture or size, which can then be used more effectively for treatment planning and monitoring.

It is noted that, while a particular application directed to analysis of lesions in breast MRI is shown, the technology is not limited to the specific embodiment illustrated. The present technology has application to, for example, other types of images obtained by other imaging techniques (e.g., computed tomographic (CT), helical CT, x-ray, positron emission tomographic, fluoroscopic, ultrasound and single photon emission computed tomographic (SPECT)), and of other types of anatomical features, such as the lung, prostate, kidney, liver or brain.

Exemplary System

FIG. 1 shows a block diagram illustrating an exemplary CAD system 100. The CAD system 100 includes a computer system 101 for implementing the framework as described herein. The computer system 101 may be further connected to an imaging device 102 and a radiologist workstation 103, over a wired or wireless network. The imaging device 102 may be a radiology scanner such as a MR scanner or a CT scanner.

Computer system 101 may be a desktop personal computer, a portable laptop computer, another portable device, a mini-computer, a mainframe computer, a server, a storage system, a dedicated digital appliance, or another device having a storage sub-system configured to store a collection of digital data items. In one implementation, computer system 101 comprises a processor or central processing unit (CPU) 104 coupled to one or more computer-usable media 106 (e.g., computer storage or memory), display device 108 (e.g., monitor) and various input devices 110 (e.g., mouse or keyboard) via an input-output interface 121. Computer system 101 may further include support circuits such as a cache, power supply, clock circuits and a communications bus.

It is to be understood that the present technology may be implemented in various forms of hardware, software, firmware, special purpose processors, or a combination thereof. Computer-usable media 106 may include random access memory (RAM), read only memory (ROM), magnetic floppy disk, flash memory, and other types of memories, or a combination thereof.

In one implementation, the techniques described herein may be implemented as computer-readable program code, such as CAD module 107, tangibly embodied in computer-usable media 106. The computer-readable program code may be executed by CPU 104 to process images (e.g., MR or CT images) from the imaging device 102 (e.g., MRI or CT scanner). As such, the computer system 101 is a general-purpose computer system that becomes a specific purpose computer system when executing the computer readable program code. The computer-readable program code is not intended to be limited to any particular programming language and implementation thereof. It will be appreciated that a variety of programming languages and coding thereof may be used to implement the teachings of the disclosure contained herein.

Computer system 101 may also include an operating system and microinstruction code. The various techniques described herein may be implemented either as part of the microinstruction code or as part of an application program or software product, or a combination thereof, which is executed via the operating system. Various other peripheral devices, such as additional data storage devices and printing devices, may be connected to the computer system 101.

The radiologist workstation 103 may include a computer and appropriate peripherals, such as a keyboard and display, and can be operated in conjunction with the entire CAD system 100. For example, the radiologist workstation 103 may communicate with the imaging device 102 so that the image data collected by the imaging device 102 can be rendered at the radiologist workstation 103 and viewed on the display. The radiologist workstation 103 may include a user interface that allows the radiologist or any other skilled user (e.g., physician, technician, operator) to manipulate the image data. For example, the radiologist may identify regions of interest in the image data, or annotate the regions of interest using pre-defined descriptors via the user-interface. In one implementation, the user-interface comprises a single-click interface. The user may provide a single click, via the single-click interface, indicating the location of a seed point for segmentation. The segmented region may then be grown from the seed point location during the probabilistic segmentation process. Further, the radiologist workstation 103 may communicate directly with the computer system 101 to access and display previously processed image data (e.g., probabilistic segmentation results) so that a radiologist can manually verify the results of the present framework.

Overview of CAD Module

Figure 2:
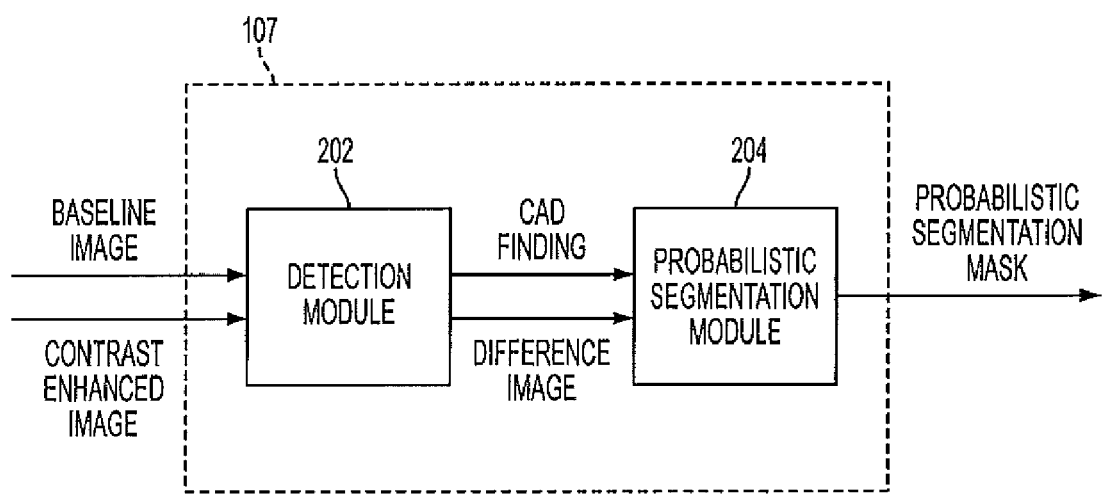
FIG. 2 shows a general overview of an exemplary CAD module.

FIG. 2 shows a general overview of an exemplary CAD module 107 which may be implemented by computer system 101. It is to be noted that in the discussion of FIG. 2 and subsequent figures, continuing reference may be made to elements and reference numerals shown in FIG. 1.

Turning back to FIG. 2, exemplary CAD module 107 receives as input image data at least one baseline (or reference) image and at least one contrast-enhanced image. The baseline image may be a pre-contrast image obtained by imaging a body prior to injecting a contrast agent (CA) into the body, and the contrast-enhanced image may be obtained by imaging the body after the injection of the CA. The contrast agent highlights structures or fluids within the body, making them easier to see. Various types of media may be used as contrast agents, depending on the imaging modalities used. For example, MRI contrast agents include gadolinium, iron oxide and manganese-based compounds.

In one implementation, the contrast-enhanced images comprise dynamic contrast-enhanced MRI (DCE-MRI). DCE-MRI may be performed by acquiring a sequence of magnetic resonance (MR) images that span a time before CAs are introduced into the patient's body and a time after the magnetic contrast agents are introduced. The sequence of contrast-enhanced MR images provides spatial and temporal understanding of suspicious lesions.

The CAD module 107 comprises, in one implementation, a detection module 202 and a probabilistic segmentation module 204. The detection module 202 processes the input image data to generate at least one difference image. The difference image may be generated by subtracting the baseline image from the contrast-enhanced image. In addition, the detection module may optionally provide at least one CAD finding. The CAD finding may include a seed point or an initial segmentation of the image data delineating regions of interest (ROIs). A region-of-interest refers to a volume or area (e.g., central slice of the volume) identified for further study and processing. Such CAD findings may be detected either manually or automatically. Manual findings are provided by, for example, a skilled user via a one-click-point user interface at radiologist workstation 103. The one-click-point user interface may include a graphical user interface that allows the skilled user to select a seed point in a contrast-enhanced image via an input device such as a keyboard or a mouse. Alternatively, the computer system 101 may automatically provide the CAD finding by using a computer-aided detection technique, such as one that detects points where the increase in voxel intensity is above a certain threshold. Other CAD techniques are also useful.

The difference image and the CAD finding are provided to the probabilistic segmentation module 204. The probabilistic segmentation module 204 processes the difference image and the CAD finding to generate a probabilistic segmentation mask. In one implementation, the probabilistic segmentation module 204 converts the difference image to a probabilistic representation of contrast enhancement ($I_{CE}$) and applies probabilistic methods, such as connectivity and/or distance processes, to the $I_{CE}$ to obtain a probabilistic segmentation mask. Various types of features (e.g., shape, texture, size, etc.) may then be extracted from the probabilistic segmentation mask.

Figure 3:
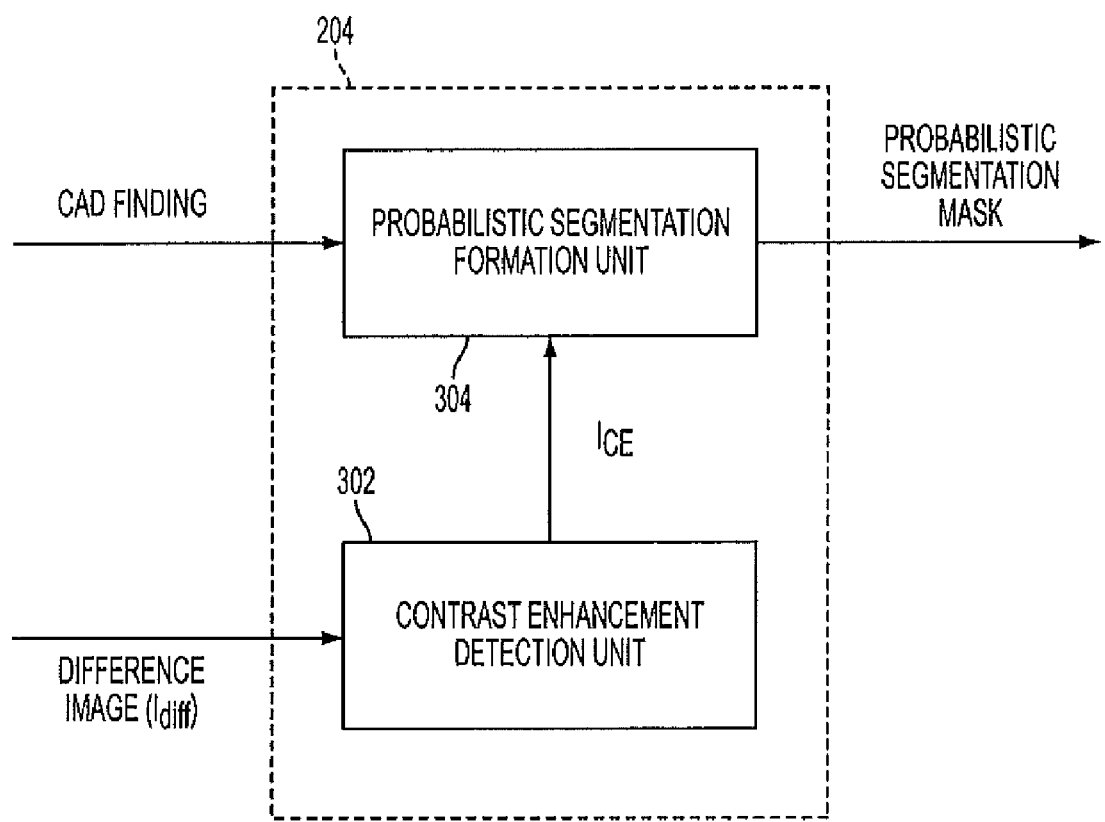
FIG. 3 shows an exemplary probabilistic segmentation module.

FIG. 3 illustrates an exemplary probabilistic segmentation module 204 in more detail. In one implementation, the probabilistic segmentation module 204 comprises a contrast enhancement detection unit 302 and a probabilistic segmentation formation unit 304. The contrast enhancement detection unit 302 converts the difference image ($I_{diff}$) into a probabilistic representation of contrast enhancement ($I_{CE}$). The probabilistic segmentation formation unit 304 then generates the probabilistic segmentation mask based on the $I_{CE}$. Each voxel of the probabilistic segmentation mask is indicative of a likelihood that the corresponding voxel belongs to a pre-determined class (e.g., tumor class) based on at least one feature. The feature includes, for example, connectivity or distance to a seed point. Any other suitable features, such as morphology or speed of enhancement, may also be used.

Contrast Enhancement Detection

Figure 4:
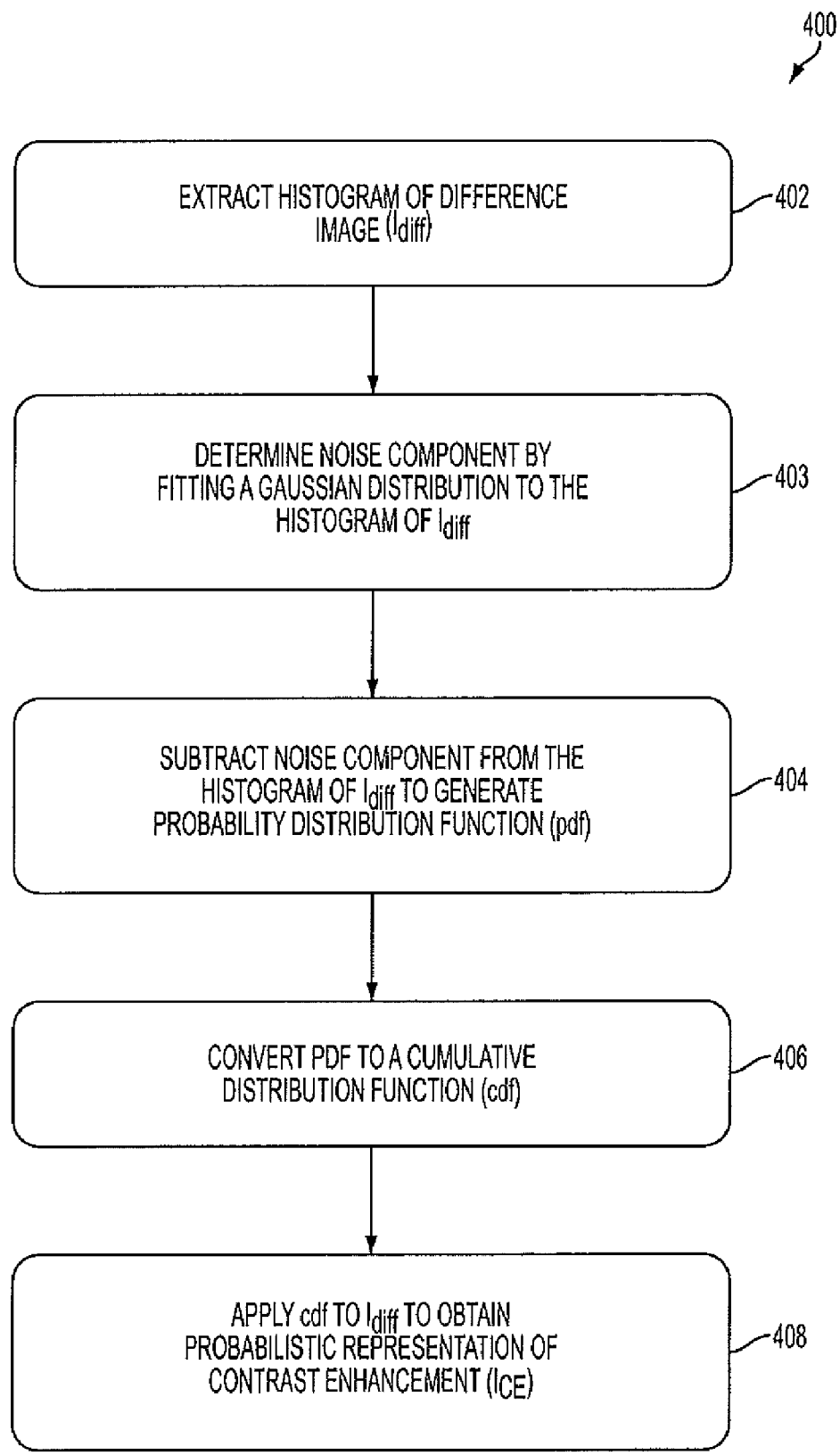
FIG. 4 shows an exemplary contrast enhancement detection method.

FIG. 4 shows an exemplary contrast enhancement detection method that can be implemented by the contrast enhancement unit 302 to construct $I_{CE}$ from $I_{diff}$.

At 402, a histogram is extracted from the difference image ($I_{diff}$). The histogram is extracted by, for example, counting the number of voxels in each unit interval of intensity. FIG. 5(a) shows an exemplary histogram (A) of $I_{diff}$ plotted as a continuous curve that depicts the probability that a variable will have an intensity value in a particular unit interval. The vertical axis is the probability and the horizontal axis is the range of negative to positive values the variable can take.

The histogram is a mixture of component distributions, including background noise components, which may be assumed to be Gaussian noise. Gaussian noise, also known as random noise or "quantum mottle," is a statistical noise that can be estimated by a normal probability distribution function. Gaussian noise may be due to, for example, random variations in the measured signal. Such noise may confuse medical practitioners during image interpretation by masking low-contrast lesions with "salt and pepper" artifacts.

Referring back to FIG. 4, at 403, the noise component of $I_{diff}$ is extracted from the histogram by fitting a Gaussian distribution to the histogram of $I_{diff}$. In one implementation, the Gaussian distribution is fitted such that the negative portion of the Gaussian distribution coincides with the negative portion of the histogram. Since the histogram is obtained by subtracting the pre-contrast image from the post-contrast image (with higher intensity values), negative intensity values usually indicate the presence of noise. Therefore, the negative portion of the noise distribution corresponds to the negative portion of the histogram.

Figure 5B:
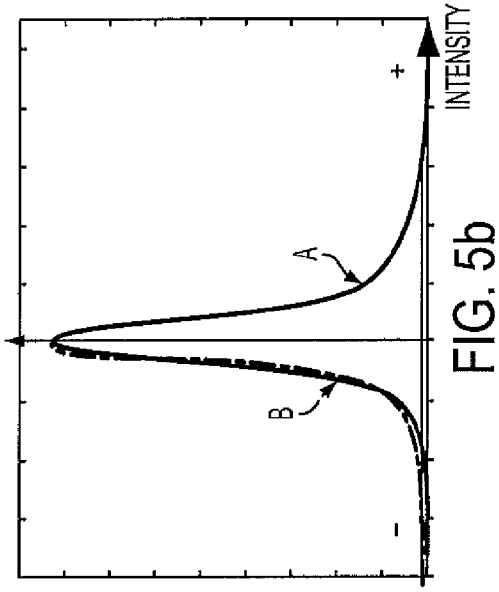
FIGS. 5(a)-(d) illustrate the resulting probability distribution curves generated by various steps of an exemplary histogram fitting process.
Figure 5D:
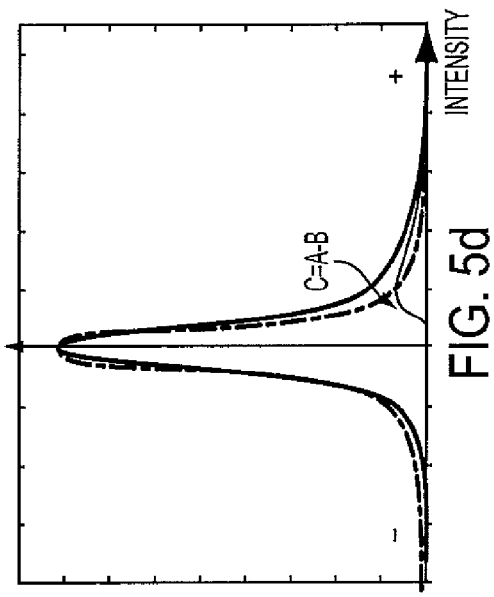
Figure 5A:
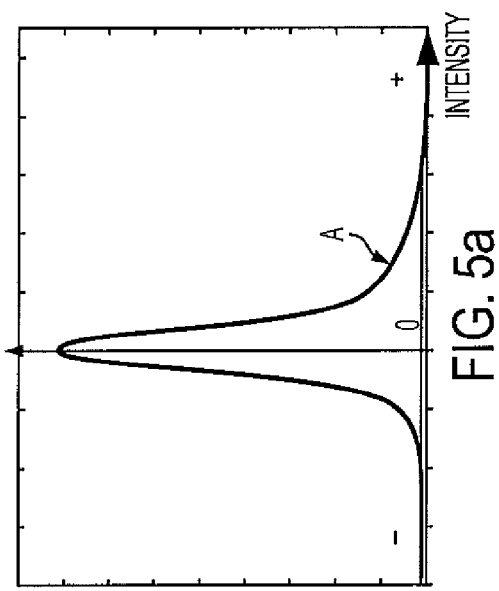
Figure 5C:
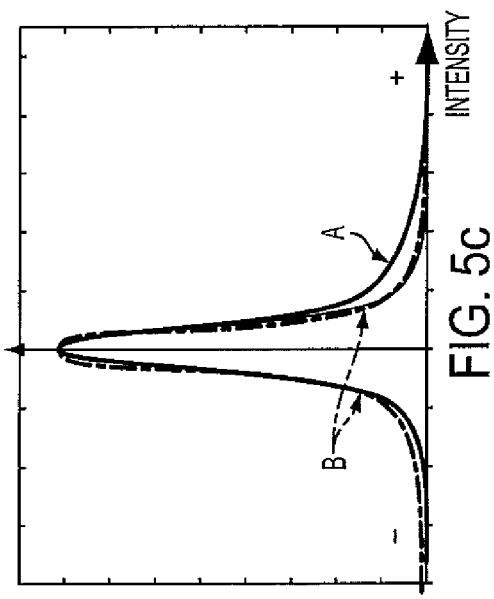

FIGS. 5(b) and 5(c) illustrate the construction of the noise component curve (B) in further detail. FIG. 5(b) shows the construction of the negative portion of the noise component curve (B). The negative portion may be constructed by fitting the negative portion of the Gaussian curve such that it coincides with the negative portion of the histogram (A). FIG. 5(c) shows the construction of the positive portion of the noise component curve (B). Since the Gaussian curve is symmetrical, the positive portion of the noise component curve (B) may be constructed by reflecting or flipping the negative portion of the histogram (A) about the vertical axis.

Referring back to FIG. 4, at 404, the noise component of $I_{diff}$ is removed from the histogram of $I_{diff}$ to generate a probability distribution function (pdf). This may be achieved by subtracting the noise component curve from the $I_{diff}$ histogram to remove voxels that represent background noise. As shown in FIG. 5(d), the noise component (B) is subtracted from the original $I_{diff}$ histogram (A) to obtain the probability distribution function (pdf) (C).

At 406, the probability distribution function (pdf) is converted to a cumulative distribution function (cdf). In one implementation, the pdf f(t) is converted into cdf F(x) using the following equation:

$$F(x) = \int_{-\infty}^{x} f(t)dt,$$

wherein x denotes a random variable representing the intensity of a voxel.

Figure 6A:
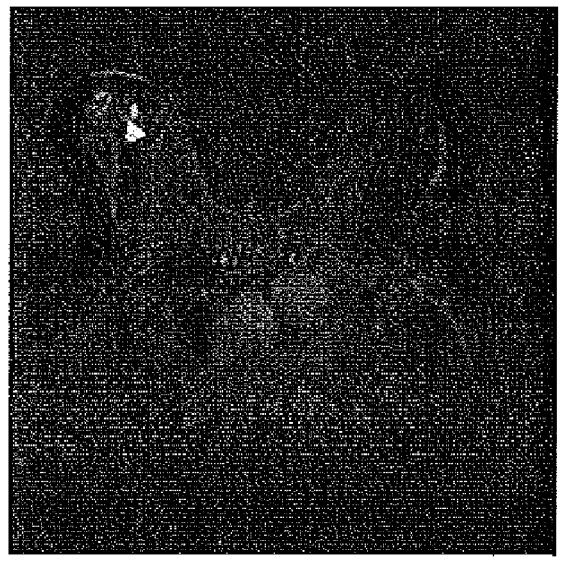
FIGS. 6(a) and 6(b) show an original $I_{diff}$ and the resultant $I_{CE}$ respectively.
Figure 6B:
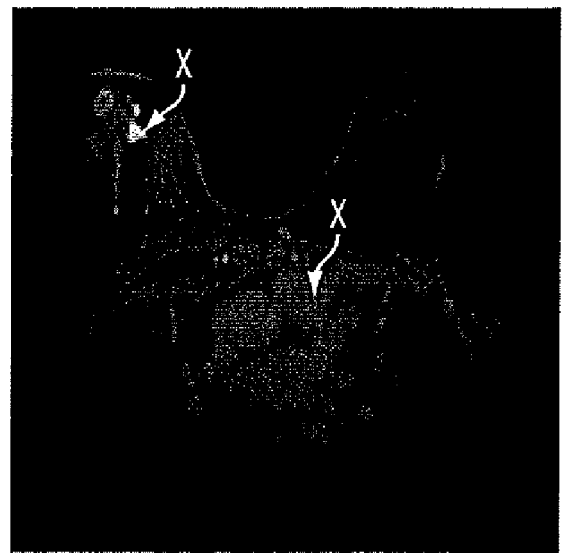

At 408, the cumulative distribution function (cdf) is applied to the original difference image ($I_{diff}$) to obtain the probabilistic representation of contrast enhancement ($I_{CE}$). In particular, for each voxel of $I_{CE}$, the probabilistic representation is determined by computing the cdf (F(x)) given the intensity value x of the corresponding voxel in $I_{diff}$. FIGS. 6(a) and 6(b) show the original $I_{diff}$ and the resulting $I_{CE}$ respectively. The $I_{CE}$ generated by the contrast enhancement detection process shows regions (e.g., X) of high intensity which represent high probabilities of contrast enhancement.

Probabilistic Segmentation Formation

The probabilistic segmentation formation unit 304 generates a probabilistic segmentation mask from the probabilistic representation of contrast enhancement ($I_{CE}$). Each voxel v of the probabilistic segmentation mask represents the probability that the voxel belongs to a pre-determined class (e.g., tumor class). This determination is based on a set of features $F_1, F_2, \ldots, F_n$: $P(v_{tumor}|F_1, F_2, \ldots, F_n)$, where n is the number of features used for classification. The posterior probability may be obtained by a naïve-Bayes formulation:

$$P(v_{tumor} \mid F_1, F_2, \ldots, F_n) \alpha \prod_{i=1}^{n} P(F_i \mid v_{tumor}).$$

Connectivity and distance (or spatial) features, as well as other features, may be incorporated into the posterior probability function of the class:

$$P(v_{tumor} \mid F_{connectivity}, F_{distance}, \ldots, F_n) \alpha P \\ (F_{connectivity} \mid v_{tumor}) P(F_{distance} \mid v_{tumor})$$

Voxels are added to the initially segmented ROI via a region growing process. Region growing is a local process that uses the intensity properties of voxels around a seed point $(x_0, y_0, z_0)$ to determine if the voxel belongs to, for example, a tumor class. The intensity properties may be obtained from the $I_{CE}$ generated by the contrast enhancement detection unit 302. During a region growing iteration, features such as connectivity and/or distance features, are calculated.

In one implementation, the seed point $(x_0, y_0, z_0)$ is provided by a skilled user via, for example, the one-click user interface at the radiologist workstation 103. Alternatively, the seed point may be provided by the computer system 101 during segmentation. For example, the computer system 101 may provide the seed point by detecting the centroid, the most enhancing point or the most suspicious point in a segmented ROI.

In one implementation, the seed point $(x_0, y_0, z_0)$ is used to determine the neighboring voxels that are connected to the tumor class based on intensity properties from the $I_{CE}$. The probabilistic segmentation formation unit 304 generates a connectivity map from the probabilistic representation of contrast enhancement ($I_{CE}$). The connectivity map indicates the likelihood of each voxel belonging to the tumor class, based on connectivity. Connectivity is indicative of the likelihood that the respective voxel is part of the same structure as the seed point $(x_0, y_0, z_0)$. Thus, voxels which are part of the same structure (or connected to) the seed point are more likely to belong to a tumor class. The tumor connectivity likelihood at each point (x, y, z) may be derived as follows:

$$P(F_{connectivity} \mid v_{tumor}(x,y,z)) = I_{CE}(x,y,z) * I_{CE}(x_0,y_0,z_0)$$

Figure 7:
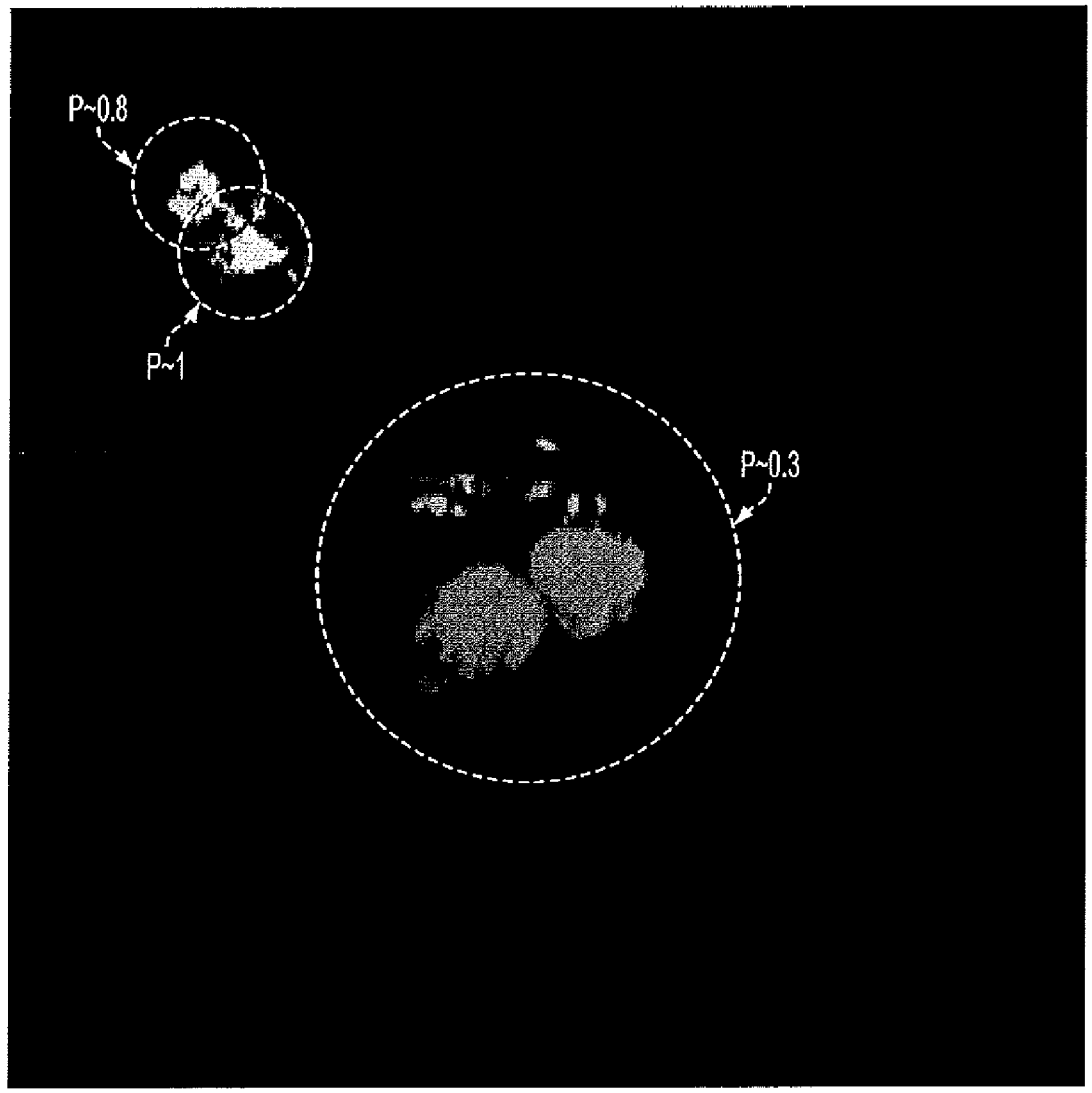
FIG. 7 shows an exemplary image with regions of various tumor probabilities based on connectivity.

FIG. 7 illustrates the principle of the likelihood of tumor based on connectivity. An exemplary medical image is shown, with regions of various tumor probabilities (P) based on connectivity with a seed point. The seed point is located at the center of the region where P is approximately 1. As can be observed, the seed point is able to find a neighboring tumor located in the region where P is approximately 0.8. The image also shows how the seed point is connected to regions that are normal but enhancing, such as a neighboring blood vessel in the z-plane denoted by the region where P is approximately 0.3.

In addition or alternatively, the probabilistic segmentation mask may also be based on a distance feature. The distance feature assigns the probability of a voxel being part of a tumor class based on its distance from the seed point. Thus, voxels at a large distance from the seed point result in significantly lower tumor probability values. Similar to the connectivity map, a distance map may be generated during the region growing iteration, based on the intensity properties from $I_{CE}$. The distance map may be combined with the connectivity map to generate the probabilistic segmentation mask.

Figure 8:
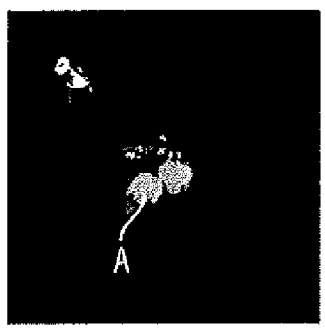
FIGS. 8(a)-(c) show images of exemplary slices with regions of various tumor probabilities based on distance.
Figure 8:
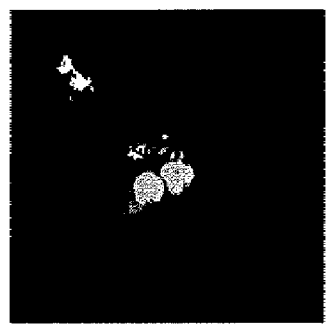
Figure 8:
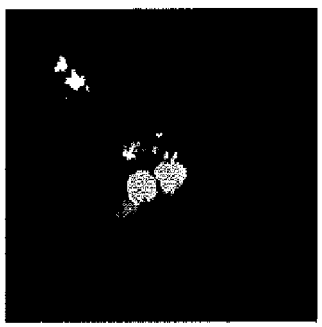
Figure 8:
Figure 8:
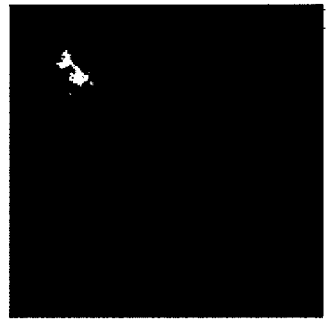
Figure 8:

In one implementation, the distance map indicates the likelihood of tumor based on distance, and accounts for enhancing normal (or non-tumor) regions (e.g., blood vessels) that are in close proximity to the tumor. The distance likelihood may be derived as follows:

$$P(F_{distance} \mid v_{tumor}(x, y, z)) = \begin{cases} 1, & D(v_{(x,y,z)} v_{(x0,y0,z0)}) \leq t_{distance} \\ e^{-D(v(x,y,z),v(x0,y0,z0))}, & D(v_{(x,y,z)} v_{(x0,y0,z0)}) > t_{distance} \end{cases}$$

where $D(v_{(x,y,z)} v_{(x0,y0,z0)})$ represents a distance between the voxel (v(x,y,z)) being considered and the seed point (v(x0, y0, z0)). The distance may comprise a non-negative distance such as a Manhattan (or rectilinear) distance, a Euclidean distance or any other types of distances. $t_{distance}$ represents a user-customized distance threshold. The distance threshold may be, for example, 100 or any other suitable values. Voxels within a distance less than the threshold from the seed point will be assigned a tumor likelihood of 1, and those greater than the threshold distance will be assigned a tumor likelihood that decreases exponentially. FIGS. 8(a)-(c) show images of exemplary slices with regions of various tumor probability based on distance.

Since tumors vary in size, normal enhancing blood vessels may be close to the tumor. To avoid such normal enhancing regions from being included in the probabilistic segmentation mask, a spatial constraint may be enforced. For example, the morphology of the ROI may be examined to determine the likelihood of it corresponding to normal tissue or a tumor. If the likelihood of the ROI corresponding a tumor is higher (e.g., evidenced from an irregular shape), it will be included in the probabilistic segmentation mask; otherwise, it will be excluded. Other spatial constraints, such as the distance of the ROI to a line segment, may also be used.

FIGS. 8(a)-(c) show images of exemplary slices with regions of various tumor probability based on distance. The incorporation of distance mapping modifies the probabilities such that normal but enhancing structures (A) shown in the "before" images are not included in the resulting probabilities maps shown in the "after" images.

Experimental Results

Figure 9:
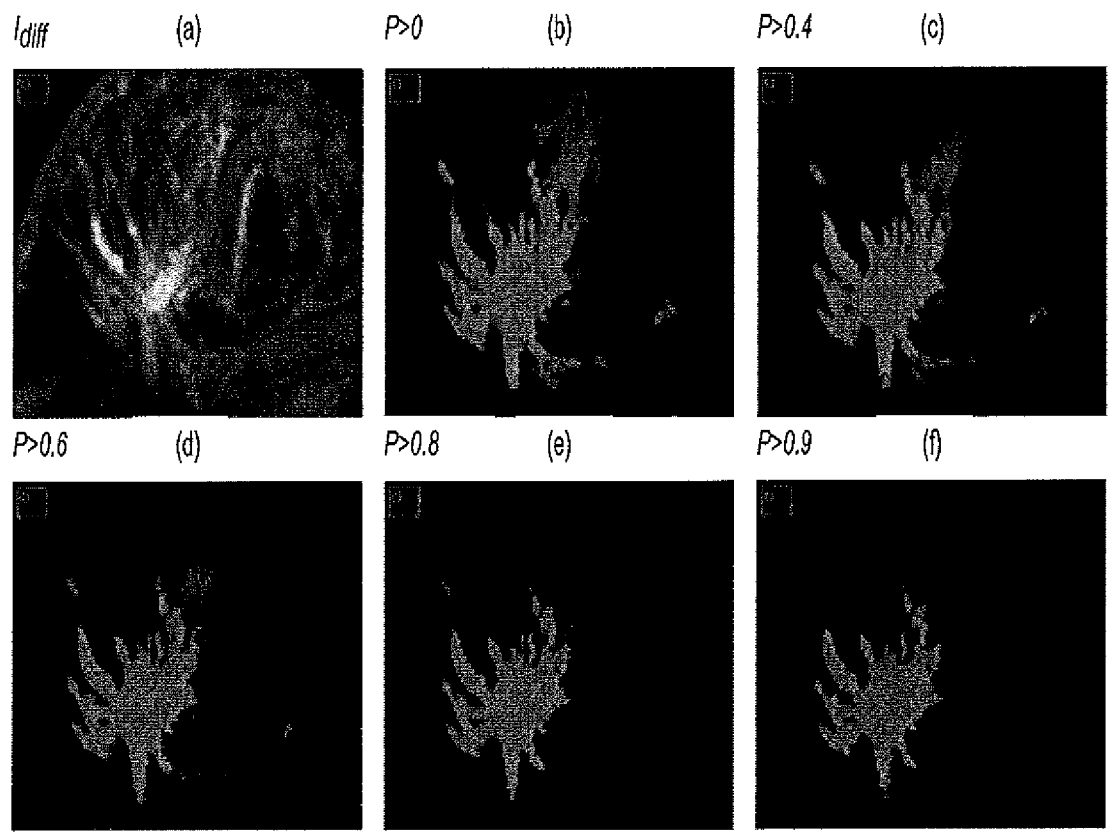
FIG. 9(a) shows an exemplary difference image of an extensively spiculated case and FIGS. 9(b)-(f) show the probabilistic segmentation output images at different levels of probability thresholds.
Figure 10:
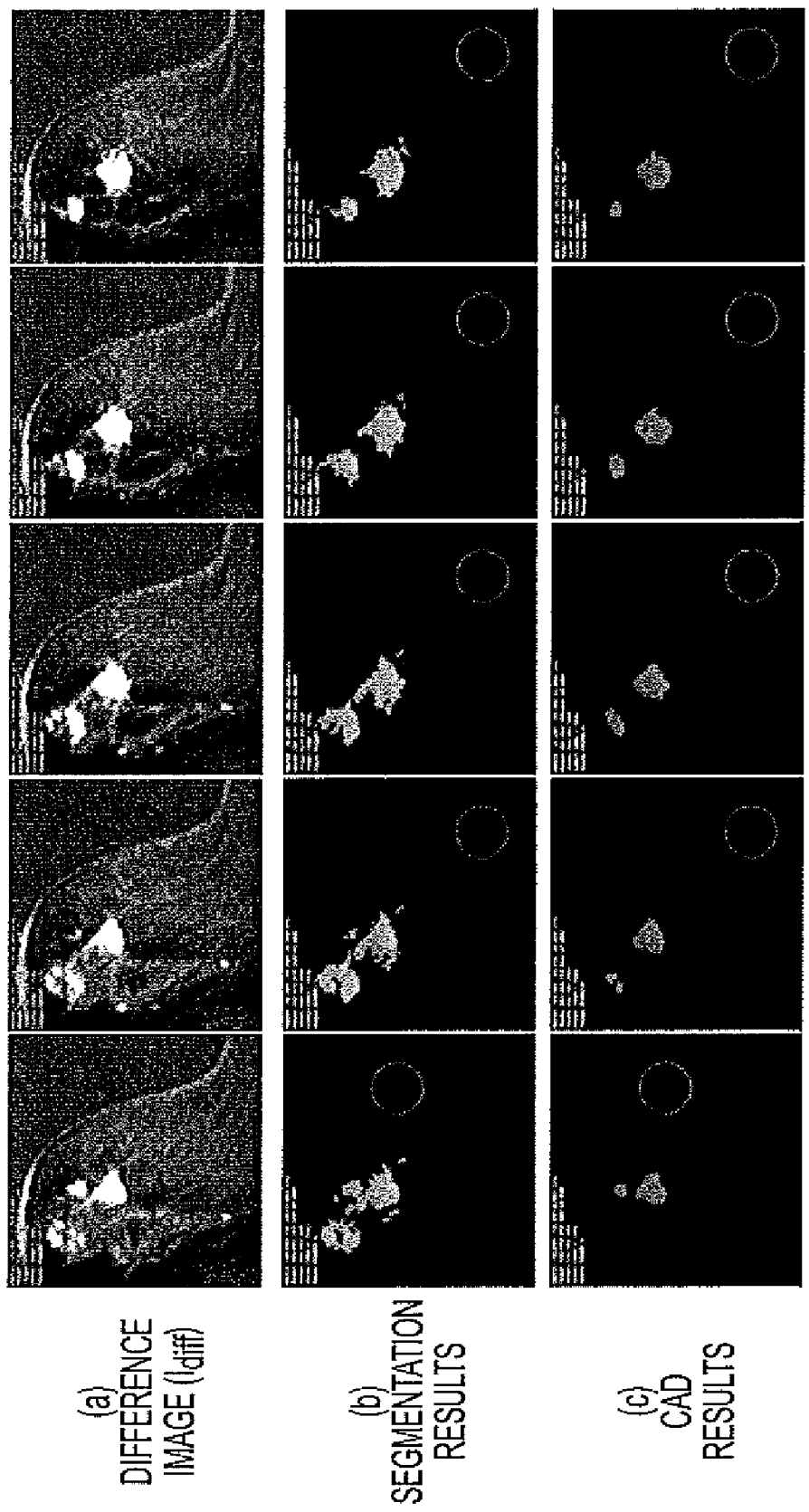
FIGS. 10(a)-(c), 11(a)-(c) and 12(a)-(c) show how the probabilistic segmentation results compare to ordinary non-probabilistic CAD segmentation results.
Figure 11:
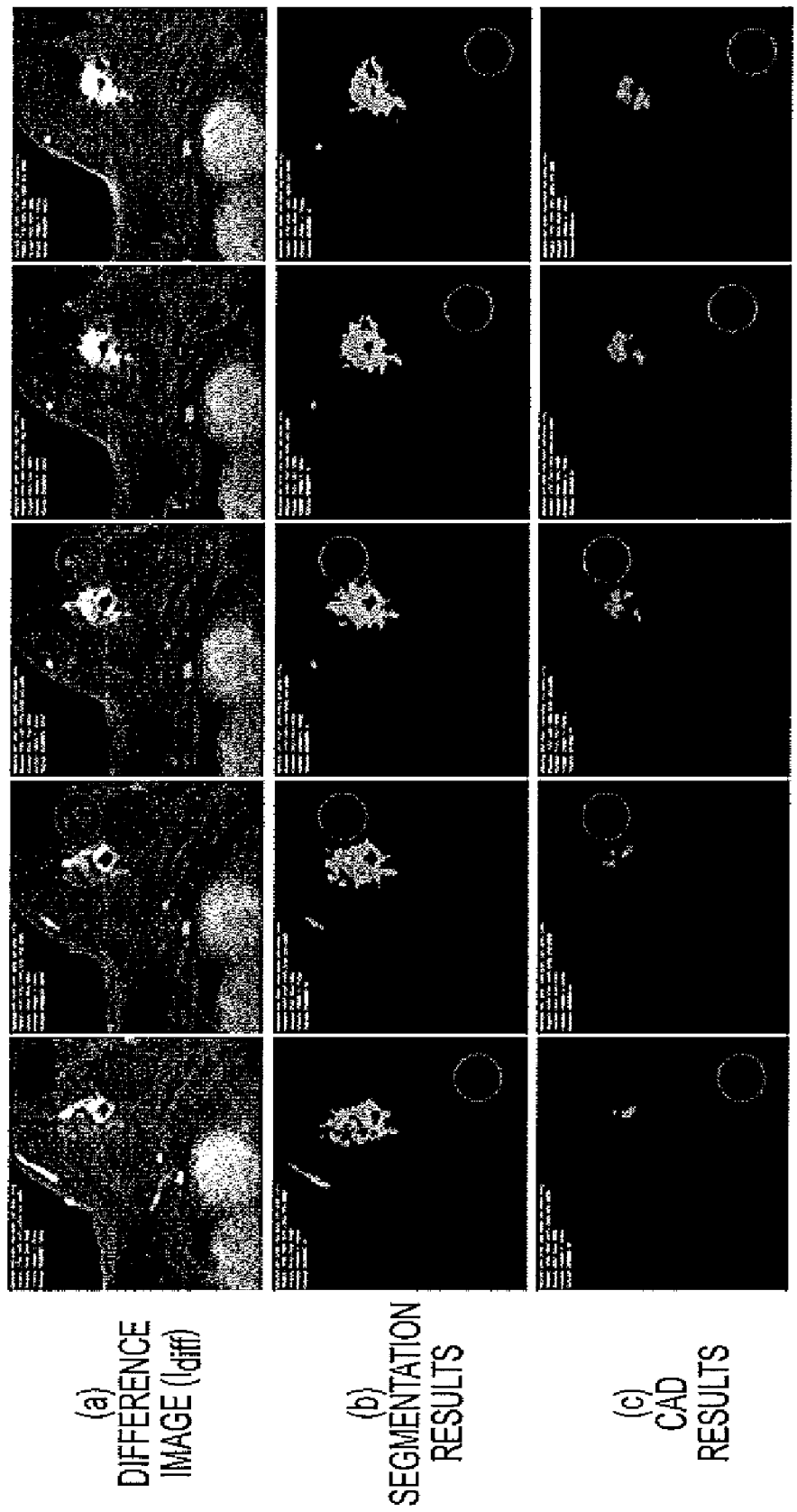
Figure 12:
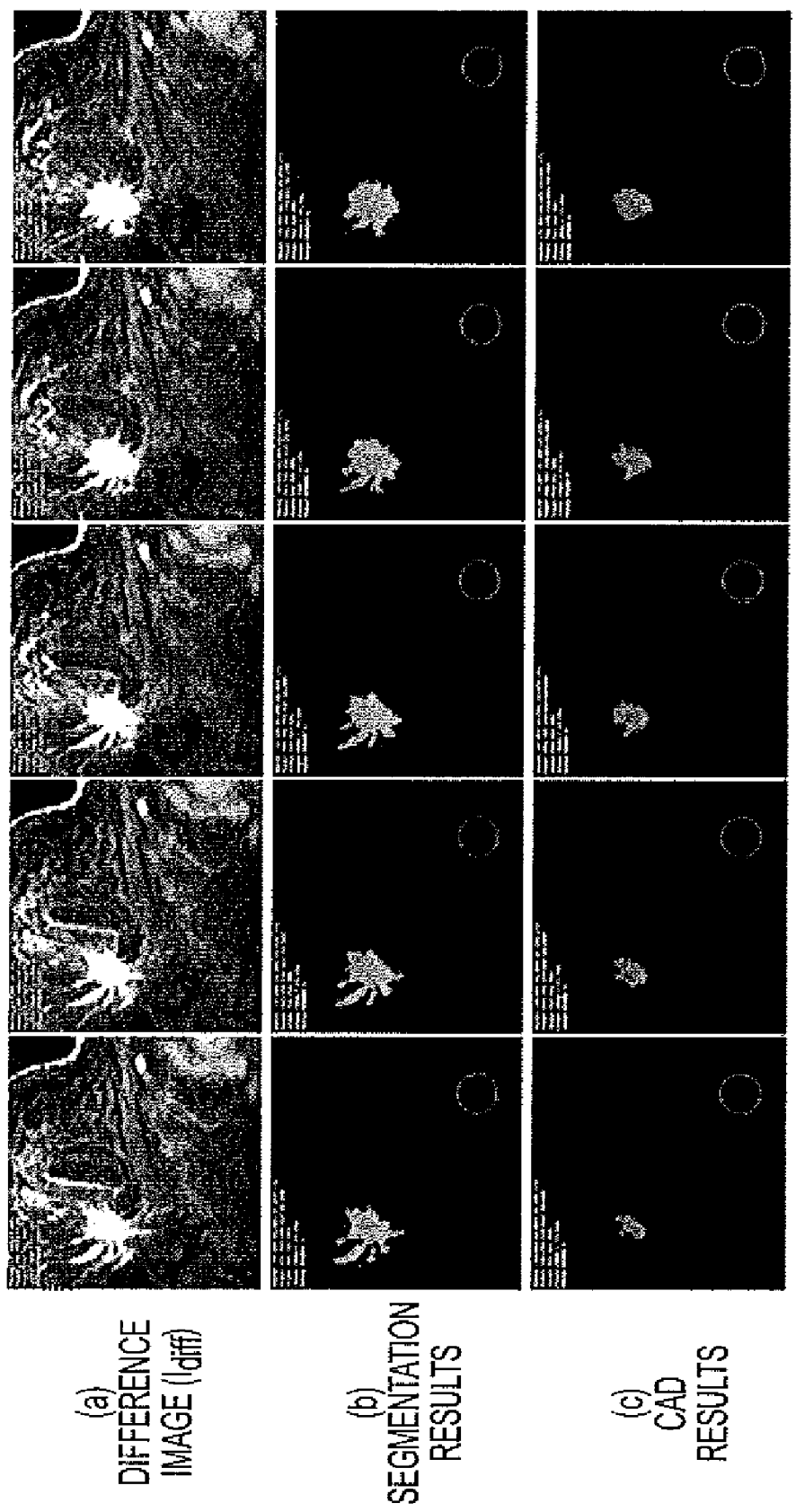

Various experiments were carried out to test the performance of the present framework. FIG. 9(a) shows an exemplary difference image of an extensively spiculated lesion and FIGS. 9(b)-(f) show the probabilistic segmentation output images at different levels of probability thresholds (P) obtained by the present framework. FIGS. 10(a)-(c), 11(a)-(c) and 12(a)-(c) show how the probabilistic segmentation mask (binarized at probability threshold value higher than 0.9) compare to conventional non-probabilistic CAD segmentation results. The conventional non-probabilistic CAD segmentation results were obtained by applying a threshold to the contrast-enhanced image. As can be observed from these figures, the probabilistic segmentation masks shown in FIGS. 10(b), 11(b) and 12(b) delineate the lesion better than the non-probabilistic results shown in FIGS. 10(c), 11(c) and 12(c).

Figure 13:
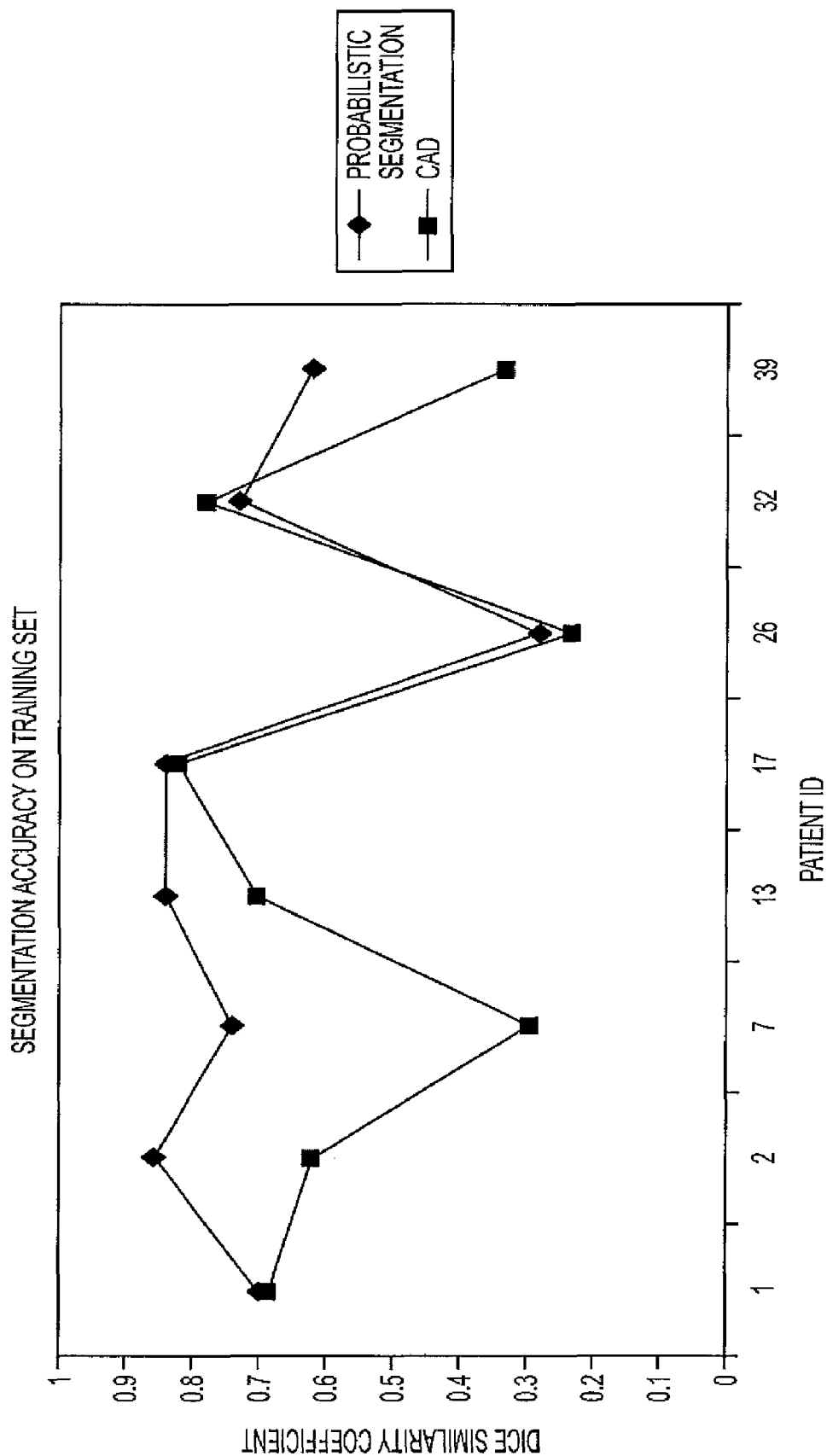
FIG. 13 shows a graph comparing the probabilistic segmentation results to ordinary non-probabilistic CAD segmentation results.

FIG. 13 shows a graph comparing the probabilistic segmentation results obtained by the present framework to ordinary non-probabilistic CAD segmentation results in another experiment. A set of 8 cases were manually labeled as a ground truth validation set. The dice similarity coefficient metric was calculated to compare the performance between the probabilistic segmentation and ordinary CAD segmentation. The probabilistic segmentation algorithm was implemented in C++ and runtime was approximately 1 second. The results were plotted in a graph shown in FIG. 13. It can be observed that for a majority of the test cases in the training set, the present probabilistic segmentation provided a higher dice similarity coefficient, indicating higher segmentation accuracy, than the non-probabilistic CAD results.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A computer-implemented method of segmentation, comprising:
   receiving at least one difference image;
   extracting at least one histogram of the difference image;
   determining a noise component by fitting a symmetric Gaussian distribution to the histogram such that a negative portion of the Gaussian distribution coincides with a negative portion of the histogram;
   subtracting the noise component from the histogram to generate a probability distribution function;
   converting the probability distribution function to a cumulative distribution function; and
   applying the cumulative distribution function to the difference image to generate a probabilistic representation of contrast enhancement ($I_{CE}$).

2. The method of claim 1 further comprising:
   generating the difference image by subtracting at least one baseline image from at least one contrast-enhanced image.

3. The method of claim 2 further comprising:
   acquiring, by an imaging device, the baseline image or the contrast-enhanced image by one of a magnetic resonance (MR) imaging, computed tomographic (CT), helical CT, x-ray, positron emission tomographic, fluoroscopic, ultrasound and single photon emission computed tomographic (SPECT) technique.

4. The method of claim 2 wherein the contrast-enhanced image comprises an image of an anatomical part.

5. The method of claim 2 wherein the contrast-enhanced image comprises a dynamic contrast-enhanced magnetic resonance (MR) image.

6. The method of claim 1 further comprising:
   outputting a probabilistic segmentation mask based on the probabilistic representation of contrast enhancement, wherein each voxel of the probabilistic segmentation mask is indicative of a likelihood that the voxel belongs to a pre-determined class based on at least one feature.

7. The method of claim 6 wherein the pre-determined class comprises a tumor class.

8. The method of claim 6 further comprising:
   providing a seed point in the probabilistic representation of contrast enhancement ($I_{CE}$); and
   growing a segmented region from the seed point using intensity properties from the probabilistic representation of contrast enhancement ($I_{CE}$).

9. The method of claim 8 further comprising providing the seed point via a one-click user interface.

10. The method of claim 8 further comprising providing the seed point by detecting a centroid, a most enhancing point or a most suspicious point in a segmented region-of-interest.

11. The method of claim 8 wherein the step of growing the segmented region from the seed point comprises:
    computing at least one connectivity of a point in the probabilistic representation of contrast enhancement ($I_{CE}$) to the seed point.

12. The method of claim 11 further comprises computing $I_{CE}(x, y, z) * I_{CE}(x_0, y_o, z_o)$, wherein (x, y, z) is a location of a point and ($x_0, y_0, z_0$) is a location of the seed point.

13. The method of claim 8 wherein the step of growing the segmented region from the seed point comprises:
    computing at least one distance of a point in the probabilistic representation of contrast enhancement ($I_{CE}$) to the seed point.

14. The method of claim 13 wherein the distance comprises a non-negative distance.

15. The method of claim 14 wherein the distance comprises a Manhattan distance.

16. The method of claim 13 further comprising assigning, to a voxel of the probabilistic segmentation mask, a likelihood of one, if the distance is less than a distance threshold.

17. The method of claim 13 further comprising assigning, to a voxel of the probabilistic segmentation mask, a likelihood determined by a decreasing exponential function of the distance, if the distance is more than a distance threshold.

18. A computer usable medium having a computer readable program code tangibly embodied therein, said computer readable program code adapted to be executed by a processor to implement a method of segmentation, comprising:
    receiving at least one difference image;
    extracting at least one histogram of the difference image;
    determining a noise component by fitting a symmetric Gaussian distribution to the histogram such that a negative portion of the Gaussian distribution coincides with a negative portion of the histogram;
    subtracting the noise component from the histogram to generate a probability distribution function;
    converting the probability distribution function to a cumulative distribution function; and
    applying the cumulative distribution function to the difference image to generate a probabilistic representation of contrast enhancement ($I_{CE}$).

19. The computer usable medium of claim 18 wherein the method of segmentation further comprises:
    outputting a probabilistic segmentation mask based on the probabilistic representation of contrast enhancement, wherein each voxel of the probabilistic segmentation mask is indicative of a likelihood that the voxel belongs to a pre-determined class based on at least one feature.

20. An image segmentation system, comprising:
    a memory device for storing computer readable program code; and
    a processor in communication with the memory device, the processor being operative with the computer readable program code to:
    receive at least one difference image;
    extract at least one histogram of the difference image;
    determine a noise component by fitting a symmetric Gaussian distribution to the histogram such that a negative portion of the Gaussian distribution coincides with a negative portion of the histogram;
    subtract the noise component from the histogram to generate a probability distribution function;
    convert the probability distribution function to a cumulative distribution function; and
    apply the cumulative distribution function to the difference image to generate a probabilistic representation of contrast enhancement ($I_{CE}$).

* * * * *